US008112861B2

(12) United States Patent
Korkeakangas et al.

(10) Patent No.: US 8,112,861 B2
(45) Date of Patent: Feb. 14, 2012

(54) METHOD FOR REPLACING THE HOISTING ROPING OF AN ELEVATOR AND A TRACTION APPLIANCE ARRANGEMENT USED IN THE REPLACEMENT

(75) Inventors: Niko Korkeakangas, Loimaa (FI); Matti Hynni, Hämeenlinna (FI)

(73) Assignee: Kone Corporation, Helsinki (FI)

( * ) Notice: Subject to any disclaimer, the term of this patent is extended or adjusted under 35 U.S.C. 154(b) by 486 days.

(21) Appl. No.: 12/268,372

(22) Filed: Nov. 10, 2008

(65) Prior Publication Data

US 2009/0127033 A1 May 21, 2009

Related U.S. Application Data

(63) Continuation of application No. PCT/FI2007/000110, filed on Apr. 27, 2007.

(30) Foreign Application Priority Data

May 8, 2006 (FI) ..................................... 20060440

(51) Int. Cl.
*B23P 19/04* (2006.01)
*B66B 7/00* (2006.01)
*F16H 13/00* (2006.01)

(52) U.S. Cl. ........................ 29/402.08; 187/414; 74/413

(58) Field of Classification Search ............... 29/402.08, 29/402.01, 402.03, 402.11, 426.1, 426.4, 29/426.6, 428, 450; 187/414; 74/413
See application file for complete search history.

(56) References Cited

FOREIGN PATENT DOCUMENTS

| | | | |
|---|---|---|---|
| JP | 4-327483 | A | 11/1992 |
| JP | 5-44785 | A | 2/1993 |
| JP | 9-86823 | A | 3/1997 |
| JP | 2003-89486 | | 3/2003 |

*Primary Examiner* — John C Hong
(74) *Attorney, Agent, or Firm* — Birch, Stewart, Kolasch & Birch, LLP

(57) ABSTRACT

The present invention relates to a method and a traction appliance arrangement for replacing the hoisting roping of an elevator, which elevator comprises at least guide rails (10) along which an elevator car (7) provided with safety gear (7*a*) travels in the elevator shaft in an essentially vertical direction, a hoisting machine (8), a traction sheave (9) and roping (1*b*). The ropes (1*aa*) of the new roping (1*a*) and the ropes (1*bb*) of the old roping (1*b*) are joined to each other by splicing the ropes (1*aa* and 1*bb*) together at one of their ends and by strengthening the joint by means of compressive sleeves (4, 4*a*), after which the new roping (1*a*) is pulled into position by means of the old roping (1*b*) and the hoisting machine (8) of the elevator.

19 Claims, 6 Drawing Sheets

Figure 1:
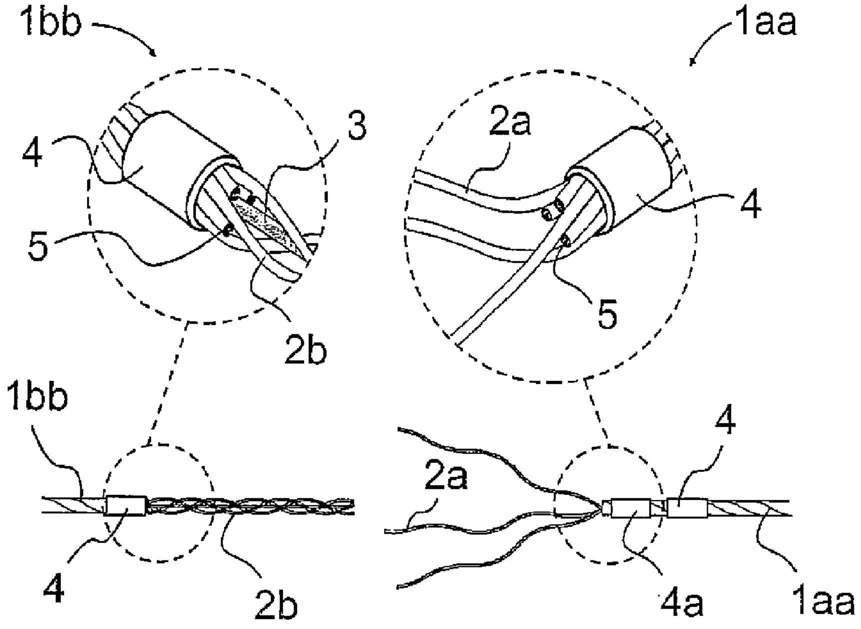

METHOD FOR REPLACING THE HOISTING ROPING OF AN ELEVATOR AND A TRACTION APPLIANCE ARRANGEMENT USED IN THE REPLACEMENT

This application is a Continuation of copending PCT International Application No. PCT/FI2007/000110 filed on Apr. 27, 2007, which designated the United States, and on which priority is claimed under 35 U.S.C. §120. This application also claims priority under 35 U.S.C. §119(a) on Patent Application No(s). 20060440 filed in Finland on May 8, 2006. The entire contents of each of the above documents is hereby incorporated by reference.

The present invention relates to a method for replacing the hoisting roping of an elevator as disclosed in the preamble of claim 1 and a traction appliance arrangement used in the replacement as disclosed in the preamble of claim 10.

The hoisting ropes used in elevators wear in use and can even break when they are worn. For this reason the safety regulations for elevators require that the hoisting ropes in elevators with hoisting ropes must be replaced with new ones at certain intervals. According to prior art the hoisting ropes are generally replaced by first removing the old hoisting ropes and after that installing the new hoisting ropes. A drawback of this solution is that replacement of the ropes with this method is awkward and takes a lot of time. Especially in elevators without counterweight, in which the suspension ratio is great, e.g. between 4:1-12:1, replacing the ropes with this conventional method is very awkward and slow owing to the numerous diverting pulleys and large rope lengths, nor is it always necessarily safe.

Prior art also includes solutions in which the new ropes are drawn into position by means of the old hoisting ropes. In this case the ends of the old hoisting ropes are detached and the new ropes are attached to the second free ends and then the new ropes are guided into place by pulling on the old ropes. One problem is making a joint between the old and the new hoisting ropes that is durable and suitably thin. Joints that are sufficiently strong can easily become so thick that they do not bend well around the rope pulleys and in addition they are easily entangled on the rope jump guards. A further problem is that this method is only suitable for thin and relatively short ropes, which are so light that they can be pulled into position by human muscle power. This method is not suited to thick and long ropes.

One prior art method in this context is pulling with a cable stocking that is intended for pulling cables. One problem with this, however, is the aforementioned thick joint between the ropes, in which case the joints easily entangle with the rope jump guards connected to the rope pulleys and the ropes fall into the shaft, causing hazards and at least becoming themselves damaged. Another problem is the uncertain durability of the joint, which has also caused falling of the ropes.

Joints are also made with wire, by splicing and securing with tape as well as by bundling some of the strands of the rope ends between the ends of the ropes. When bundling, some of the strands in the ends of the ropes are left longer and these strands are tightly bent at about halfway along the strands and then interlaced at the points of the bend. The joint is further secured with taping and greased. A problem in all the jointing methods mentioned, however, is that they are essentially laborious and uncertain or they are not at all suited to large lifting heights.

Another prior-art method for making a joint in ropes is placing an essentially large, compressive sleeve around the ends of the ropes so that the intact ends of the new and old rope are positioned inside the sleeve and the sleeve is tightly compressed around the ends of the rope. The joint is suitable for pulling ropes by hand, but it is not sufficiently strong for pulling mechanically. Likewise, owing to the large sleeve, the extension requires a large bending radius and looser jump guards on the rope pulleys, thus this method is not suited to solutions in which the diverting pulleys are small.

The purpose of this invention is to eliminate aforementioned drawbacks and to achieve an easy, quick and safe method for replacing the hoisting ropes of an elevator. Another purpose is to achieve a method that is suitable for use in many different types of suspension and for replacing the hoisting ropes of many different-sized elevators. In this case the purpose is also that the method is suited for replacing the hoisting ropes of e.g. both elevators with machine room and elevators without machine room, and likewise for replacing the hoisting ropes of elevators with counterweight and elevators without counterweight. The purpose of the invention is also to achieve a simple and operationally reliable traction appliance arrangement to use in the replacement of hoisting ropes, which receives its operating power from the elevator's own hoisting machine via the traction sheave of the elevator. The method of the invention is characterized by what is disclosed in the characterization part of claim 1 and the traction appliance arrangement of the invention is characterized by what is disclosed in the characterization part of claim 10. Other embodiments of the invention are characterized by what is disclosed in the other claims.

Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts. Correspondingly, each of the different details presented in connection with the embodiment of the invention can also be used in other embodiments.

The method according to the invention is characterized in that both the ropes of the new hoisting roping and the ropes of the old hoisting roping are joined together, after which the new hoisting roping is pulled into position by means of the old hoisting roping and a friction wheel which is arranged to press against the traction sheave and rotated by the traction sheave. Thus, the hoisting machine of the elevator can be utilized.

The method according to one preferred embodiment of the invention is characterized in that the old roping is guided to pass between the friction wheel and a lifting wheel arranged to be fitted against the friction wheel.

The method according to a second preferred embodiment of the invention is characterized in that the ropes of the new roping and the ropes of the old roping are joined to each other by splicing the ropes together at one of their ends and by strengthening the joint by means of compressive sleeves.

The method according to a third preferred embodiment of the invention is characterized in that the ropes of the roping to be replaced are hoisting ropes and in that one of the ends of each of the new and old hoisting ropes is provided with one or more compressive sleeves, the ends are opened up for a suitable length, every second strand from the opened ends is removed and the core of one of the hoisting ropes is cut off, and the ends of the opened hoisting ropes are spliced together with the remaining strands around the core of the other hoisting rope, and in that the joint location is reinforced at least at the point of the ends of the cut strands with compressive sleeves.

The method according to a yet another preferred embodiment of the invention is characterized in that the joint location is additionally reinforced with one or more compressive sleeves between the ends of the cut strands.

The method according to a yet another preferred embodiment of the invention is characterized in that at least the following procedures are performed in connection with replacement of the hoisting roping: the elevator car is locked into position in the elevator shaft; the ends that extend the hoisting ropes of the old hoisting roping are detached from their first fixing points; the hoisting ropes of the new hoisting roping and the hoisting ropes of the old hoisting roping are joined together at one of their ends and the joint location is secured by means of compressive sleeves on top of the ropes; the hoisting ropes of the old hoisting roping are detached from their second fixing point; and the hoisting ropes of the old hoisting roping are pulled out of their position by means of the hoisting machine of the elevator using service drive while at the same time feeding the hoisting ropes of the new hoisting roping into the place of the old hoisting ropes.

The method according to a yet another preferred embodiment of the invention is characterized in that in connection with replacement of the hoisting roping in an elevator equipped with a counterweight at least the following procedures are performed: the elevator car and the counterweight are locked into position in the elevator shaft; the traction appliance for the ropes is fastened in such a way that the friction wheel in the traction appliance rests against the traction sheave of the hoisting machine; the ends of the hoisting ropes of the old hoisting roping on the counterweight side are detached from their fixing points; the ends of the hoisting ropes of the old hoisting roping on the counterweight side are fitted and tightened between the friction wheel and the lifting wheel in the traction appliance; the ends of the old hoisting ropes on the elevator car side are detached from their fixing points; the hoisting ropes of the new hoisting roping and the hoisting ropes of the old hoisting roping are joined together at one of their ends and the joint location is secured by means of compressive sleeves on top of the ropes; and the hoisting ropes of the old hoisting roping are pulled out of their position by means of the hoisting machine of the elevator and the traction appliance using service drive while at the same time feeding the hoisting ropes of the new hoisting roping into the place of the old hoisting ropes.

The method according to a yet another preferred embodiment of the invention is characterized in that in connection with replacement of the hoisting roping in an elevator equipped with a counterweight at least the following procedures are performed: the elevator car and the counterweight are locked into position in the elevator shaft; the traction appliance for the ropes is fastened in such a way that the friction wheel in the traction appliance presses against the traction sheave of the hoisting machine; the ends of the hoisting ropes of the old hoisting roping on the counterweight side are detached from their fixing points; the ends of the old hoisting ropes on the elevator car side are detached from their fixing points; the hoisting ropes of the new hoisting roping and the hoisting ropes of the old hoisting roping are joined together at one of their ends and the joint location is secured by means of compressive sleeves on top of the ropes; and the hoisting ropes of the old hoisting roping are pulled out of their position by means of the hoisting machine of the elevator and the friction wheel of the traction appliance using service drive while at the same time feeding the hoisting ropes of the new hoisting roping into the place of the old hoisting ropes.

The method according to a yet another preferred embodiment of the invention is characterized in that in connection with replacement of the hoisting roping in an elevator without counterweight at least the following procedures are performed: the elevator car is locked into position in the elevator shaft; the ends that extend the hoisting ropes of the old hoisting roping are detached from their first fixing points; the hoisting ropes of the new hoisting roping and the hoisting ropes of the old hoisting roping are joined together at one of their ends and the joint location is secured by means of compressive sleeves on top of the ropes; the hoisting ropes of the old hoisting roping are detached from their second fixing point; and the hoisting ropes of the old hoisting roping are pulled out of their position by means of the hoisting machine of the elevator using service drive while at the same time feeding the hoisting ropes of the new hoisting roping into the place of the old hoisting ropes.

Likewise the traction appliance arrangement according to one preferred embodiment of the invention is characterized in that the arrangement comprises at least a traction appliance fixed into position in the elevator shaft, which appliance contains a frame, onto which frame a friction wheel provided with a suitable friction surface is fitted with bearings allowing rotation, which friction wheel is arranged to press against the traction sheave.

The traction appliance arrangement according to another preferred embodiment of the invention is characterized in that a lifting wheel provided with a suitable friction surface is fitted to the frame with bearings allowing rotation, in addition to the friction wheel, and in that the elevator hoisting rope to be replaced is arranged for placement between the friction surfaces of the friction wheel and the lifting wheel, and in that at least one of the wheels is fitted to be tightened against the other wheel when the elevator rope is placed between the friction surfaces of the wheels.

The traction appliance arrangement according to a third preferred embodiment of the invention is characterized in that the friction surface of the friction wheel is rubber, plastic, urethane or other suitable flexible material having essentially large friction.

The traction appliance arrangement according to yet another preferred embodiment of the invention is characterized in that the rim of the lifting wheel is provided with grooving, serration or other suitable surface having essentially large friction.

The traction appliance arrangement according to yet another preferred embodiment of the invention is characterized in that the dimensions of the traction appliance and the situations of the friction and the lifting wheels are selected so that when the traction appliance is fixed into position, the outer rim of the friction wheel rests against the traction sheave of the hoisting machine.

One advantage of the method and traction appliance arrangement is, among others, that even in a complex rope suspension the hoisting roping can be easily, ergonomically, efficiently and safely replaced. Another advantage is that the old and the new hoisting ropes can be joined to each other almost seamlessly with an essentially flexible joint without essentially increasing the diameter of the joint location, in which case the new ropes can be pulled into position in a single operation using the old hoisting ropes as an aid, even though the jump guards on the rope pulleys are very close to the ropes. A further advantage is that the joint location of the ropes is in terms of tensile strength sufficiently reliable and strong for mechanical replacement, so that the method can also be used for replacing essentially thick and strong ropes, which ropes would be too heavy to be pulled by hand. In this case the method can be used e.g. in so-called high-rise elevators. Another advantage is that the joint is safe and certain, because an incorrectly spliced extension cannot be used by accident since the sleeves are essentially precisely dimensioned and cannot be installed onto an incorrectly spliced extension. The flexible joint location also travels well in the grooves of the rope pulleys when performing the replacement. An additional advantage is that all the ropes of the elevator can be replaced simultaneously, in which case the replacement is fast and superfluous friction forces are avoided. As a result of the fast replacement, the elevator is out of service for a shorter time and the costs of the replacement remain small. Another advantage is that the joint is very tough, and does not in any case break unexpectedly. Yet another advantage is that the solution according to the invention enables replacement of the ropes without disassembling the elevator equipment, nor is a separate electric hoist needed in the replacement and the need for other necessary tools is minimal. The solution according to the invention is very versatile and is suited to many different suspension solutions, and an extremely good solution for steel wire ropes of which the diameter is 4 mm or greater.

Figure 2:
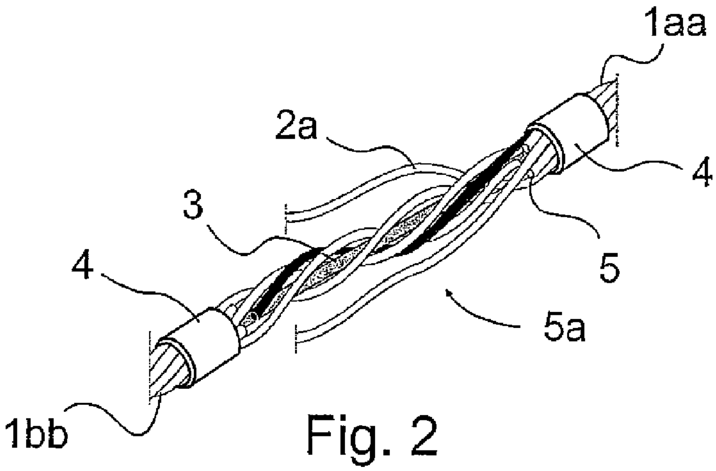
Figure 3:
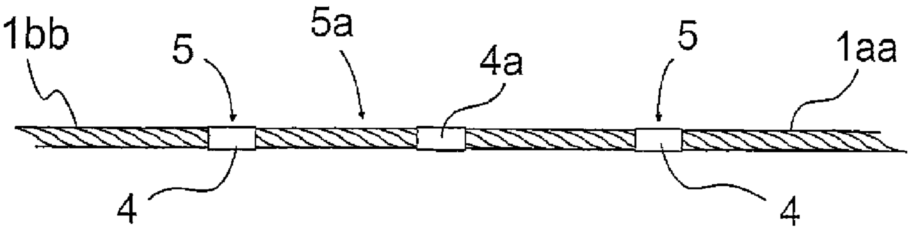
Figure 4:
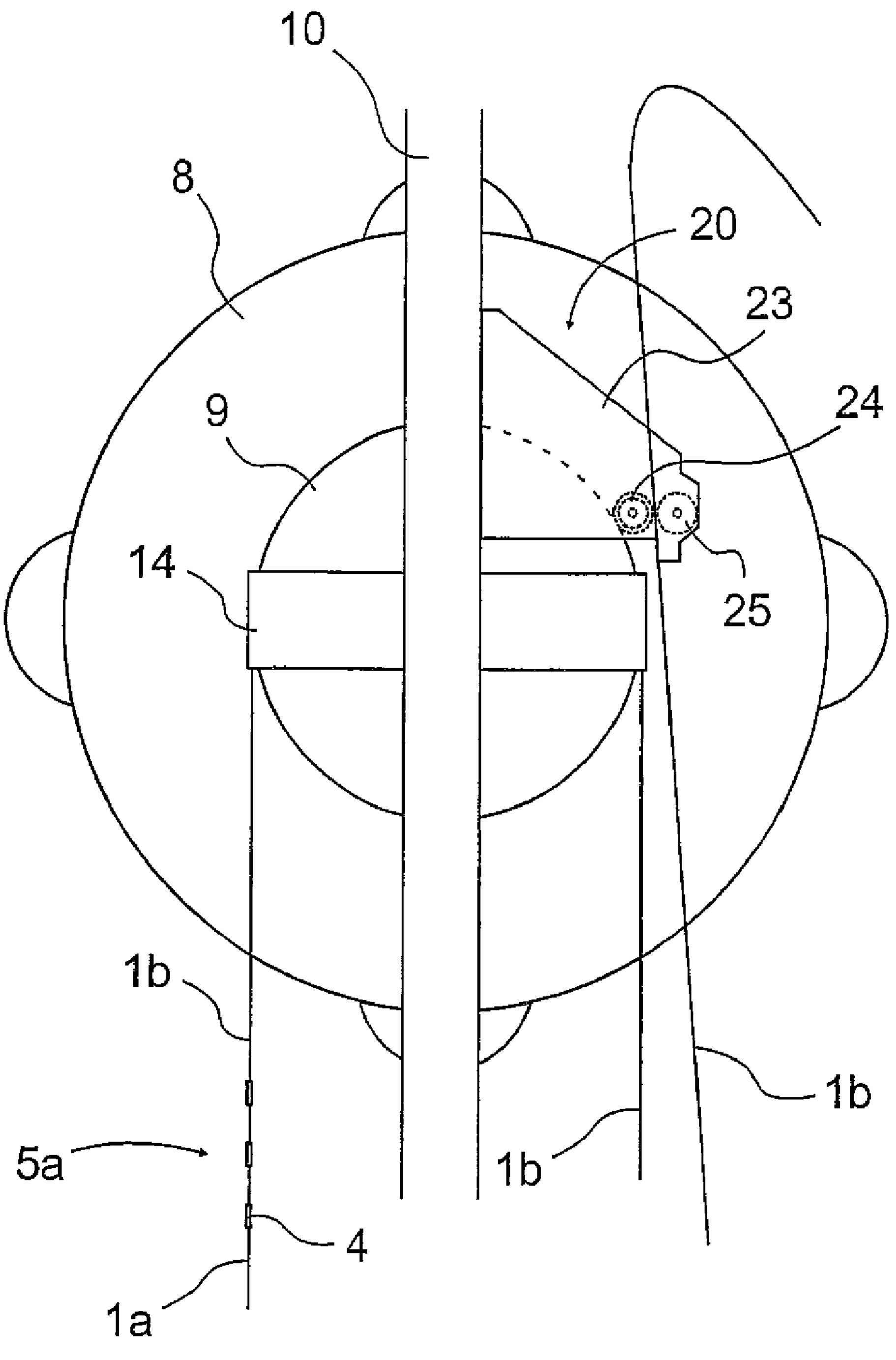
Figure 5:
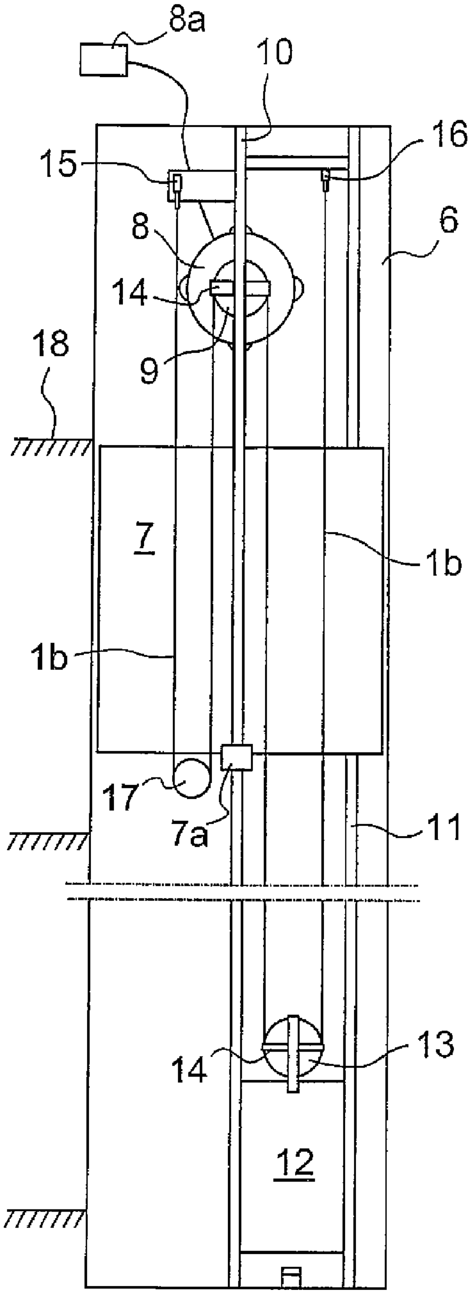
Figure 6:
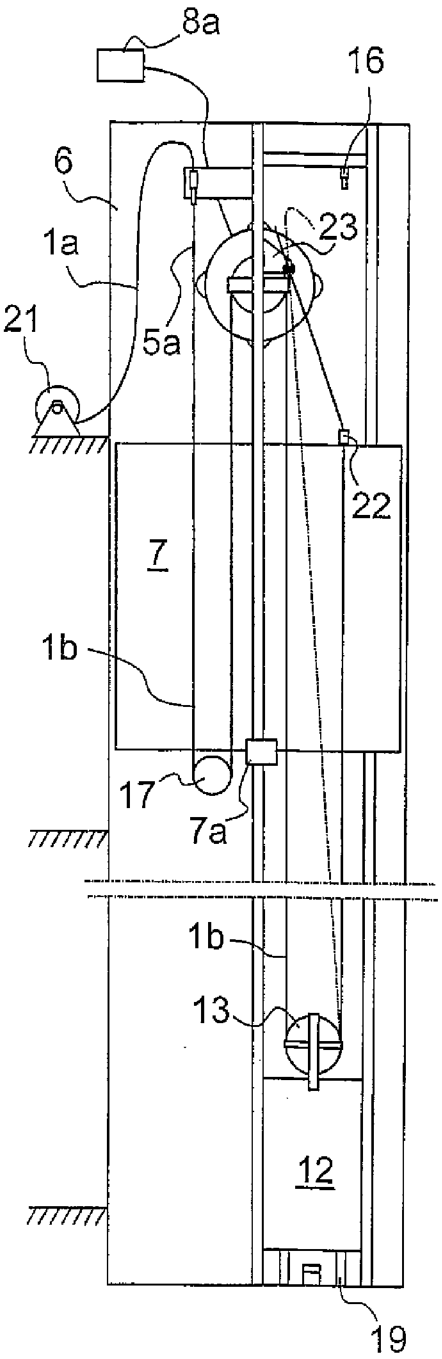
Figure 7:
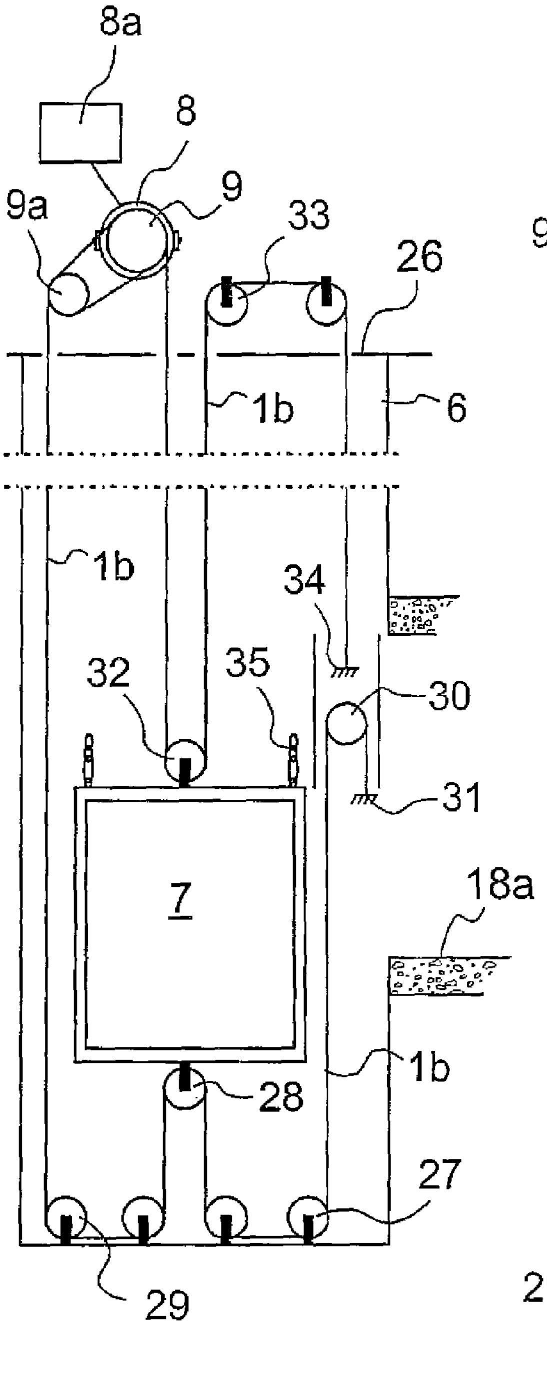
Figure 8:
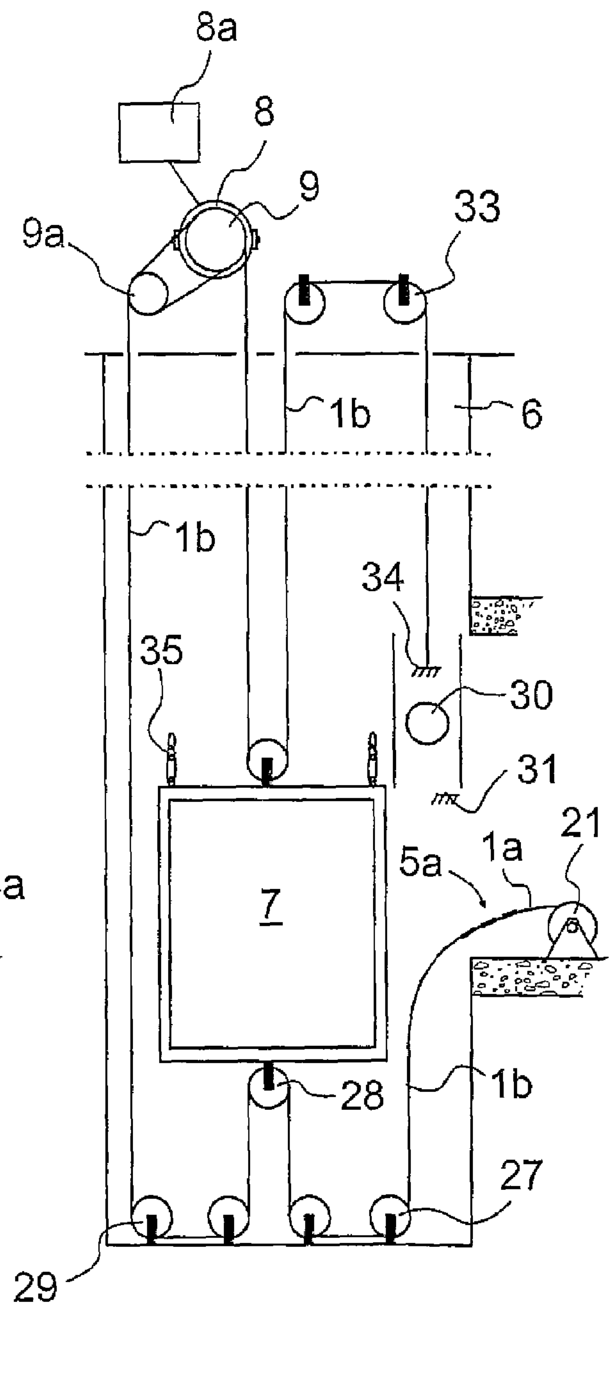
Figure 9:
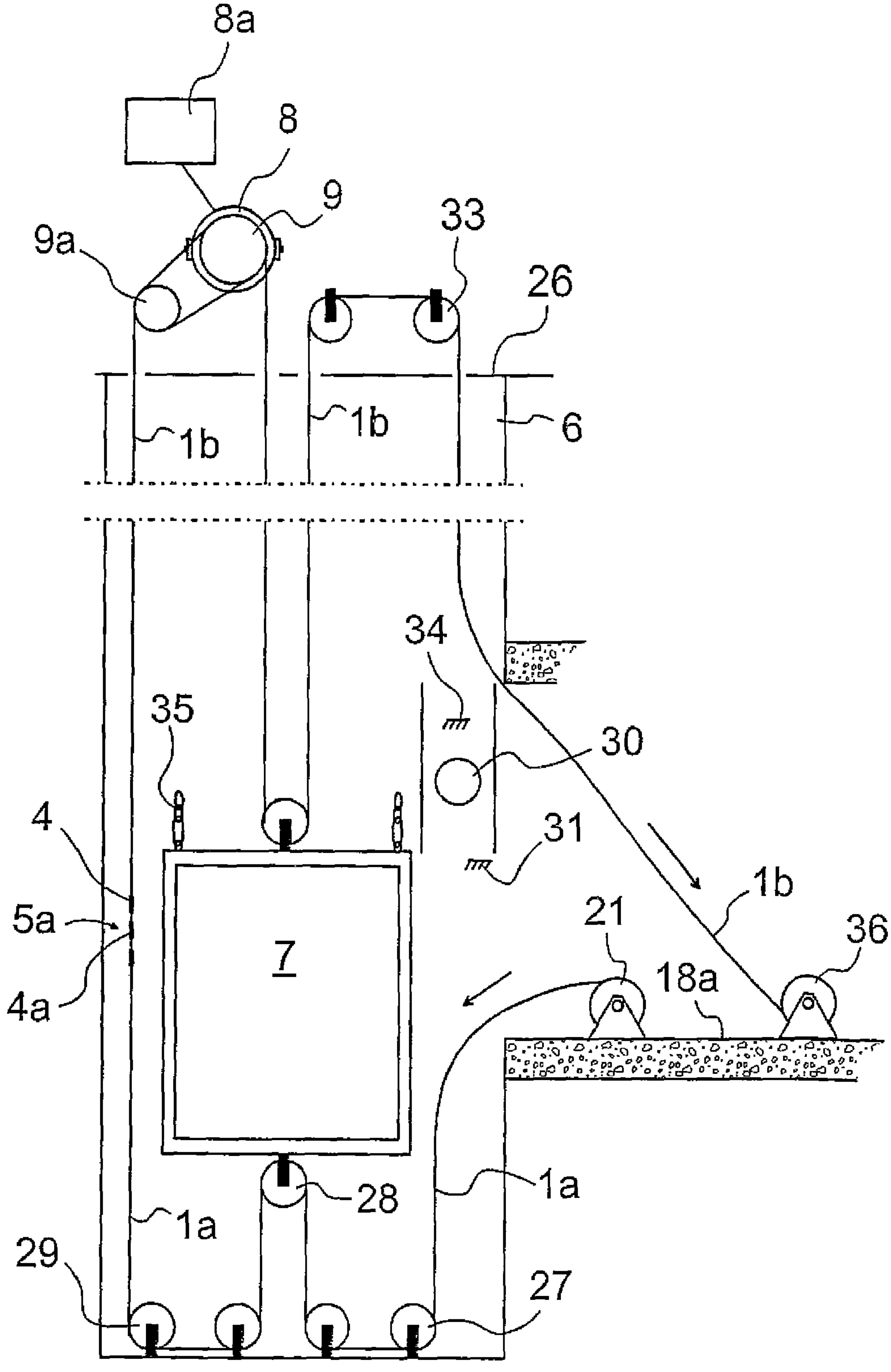
Figure 10:
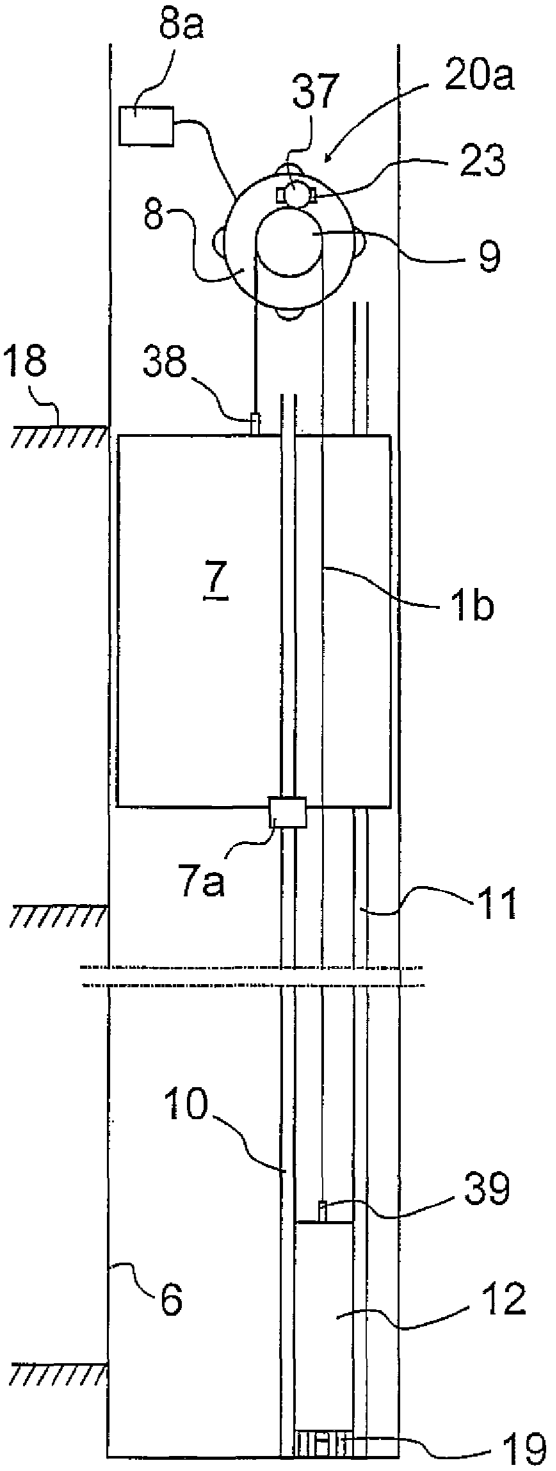

In the following, the invention will be described in more detail by the aid of one of its embodiments with reference to the attached drawings, wherein FIG. 1 presents both a new and an old hoisting rope disassembled at their ends, FIG. 2 presents the splicing together of a new and an old hoisting rope, FIG. 3 presents both a new and an old hoisting rope joined together, FIG. 4 presents a magnified side-view of a traction appliance used in the elevator solution according to FIGS. 5 and 6, FIG. 5 presents a simplified side-view of a traction sheave elevator with counterweight, in which the method according to the invention can be used, FIG. 6 presents an elevator according to FIG. 5, in which the hoisting ropes are currently being replaced, FIG. 7 presents a simplified side-view of a traction sheave elevator without counterweight, in which the method according to the invention can be used, FIG. 8 presents an elevator according to FIG. 7, in which the hoisting ropes have just begun to be replaced and FIG. 9 presents an elevator according to FIG. 7, in which replacement of the hoisting ropes has progressed further than FIG. 8 and FIG. 10 presents a simplified side-view of another traction sheave elevator with counterweight, in which the method according to the invention can be used.

FIG. 1 presents one hoisting rope 1*aa* of the new hoisting roping 1*a* as well as one hoisting rope 1*bb* of the old hoisting roping 1*b* opened up at their ends. The hoisting ropes 1*aa* and 1*bb* are opened up at their ends for essentially the same length as each other, said length being a suitable distance for the purpose and every second strand of each rope is removed for this distance. The core of the new hoisting rope 1*bb* is also removed for this distance. In this case the hoisting ropes according to the example each have three remaining strands 2*a*, 2*b*, and the old rope 1*bb* also has the core 3 of the rope remaining. Before the strands are opened up and cut off a suitable number of thin and essentially short sleeves 4, 4*a* are threaded onto the rope, the diameter of said sleeves being only slightly greater than the outer diameter of the ropes, in which case the sleeves 4, 4*a* only just fit onto the ropes. There are at least two, but preferably three, four or even more, sleeves 4, 4*a*. In the solution according to the example there are three sleeves 4, 4*a*, of which two sleeves 4 are threaded onto the end of the new rope 1*aa* and one sleeve 4*a* is threaded onto the end of the old rope 1*bb*.

FIG. 2 presents a new hoisting rope 1*aa* and an old hoisting rope 1*bb* in a situation in which the ends of the hoisting ropes have started to be spliced together. The strands 2*a* of the new hoisting rope 1*aa* have started to be threaded together with the strands 2*b* of the old rope around the core 3 of the new rope 1*aa*. The sleeves 4 and 4*a* are still so far away from each other that the cutting points 5 of the removed strands are visible on the side of the future joint 5*a* with respect to the sleeves 4 and 4*a*.

When the strands 2*a* and 2*b* are spliced together, the joint location is strengthened by means of the sleeves 4, 4*a*, e.g. according to what is presented in FIG. 3. In this case one sleeve 4, as well as one sleeve 4*a* positioned essentially in the centre of the extension point 5*a* in order to strengthen the joint, are placed onto the cutting point 5 of the strands on both the new and the old rope. All the sleeves 4, 4*a* are compressed tightly onto the rope with a suitable tool. To facilitate the installation at least the inner edges of the sleeves are beveled. The sleeves keep the cut and spliced strands inside them reliably. The finished joint is suitably flexible and very strong, and the thin sleeves do not become entangled in the jump guards of the rope pulleys. If necessary there can be more joint-strengthening sleeves 4*a* at the centre of the joint 5*a* between the sleeves 4, e.g. there can be altogether two or three sleeves 4*a*.

FIGS. 4-10 present different methods and arrangements for replacing the old hoisting roping 1*b* of an elevator after the joint described above has been made. For the sake of clarity FIGS. 4-10 present only the complete hoisting ropings 1*a* and 1*b*, not their separate hoisting ropes 1*aa* and 1*bb* installed parallel to each other. The hoisting roping 1*a* contains a plurality of hoisting ropes 1*aa* that are essentially similar to each other and positioned side by side and correspondingly the hoisting roping 1*b* contains a plurality of hoisting ropes 1*bb* that are essentially similar to each other and positioned side by side.

FIG. 4 presents a simplified and magnified side view of a traction appliance 20 for a hoisting rope used in the method according to the invention. The traction appliance 20 contains a frame 23, to which is fixed a friction wheel 24 and a rope lifting wheel 25. The friction wheel 24 is provided with a friction surface that enables good friction grip, such as with a rubber lining or plastic lining or e.g. with a polyurethane lining, with a combination of the aforementioned or with some other suitable and flexible lining. The friction wheel can also be made so that instead of a flexible material the friction wheel 24 is spring-mounted by means of a separate spring or similar. Likewise the rim of the lifting wheel 25 is provided with a V-groove, serration or other suitable surface. The friction wheel 24 and the lifting wheel 25 are fitted to the frame 23 with bearings allowing rotation and positioned in relation to each other such that the lifting wheel 25 can be tightened with a tightening element suited to the purpose against the friction wheel 24. The tightening allows so much adjustment tolerance that hoisting ropes of essentially all diameters can be installed and tightly compressed between the wheels 24 and 25. The traction appliance 20 is provided with fixing means, which are fitted such that the traction appliance 20 can be fixed either to the guide rail 10 of the elevator car 7, to the structures of the hoisting machine 8 or to another suitable point, and the dimensions of the traction appliance 20 and the situations of the wheels 24, 25 are selected so that after fixing, the outer rim of the friction wheel 24 presses against the traction sheave 9. Depending on the construction and the fixing, the friction wheel 24 can press against the outer rim of the traction sheave 9 and/or against the rope in the grooves of the traction sheave or also against the side or the inner rim of the traction sheave.

The method and the appliance arrangement can be utilized beneficially so that the hoisting roping (1*b*, 1*a*) moves between the traction sheave (9) and the friction wheel (24) to a first direction, and between the friction wheel (24) and the lifting wheel (25) to a second direction.

FIG. 5 presents a simplified side view of a traction sheave elevator equipped with hoisting roping 1*b* comprised of parallel hoisting ropes 1*bb* and with a counterweight 12, in which the hoisting roping replacement method according to the invention can be used. The elevator car 7 is suspended on the hoisting roping 1*b* and it moves backwards and forwards in the elevator shaft 6 along guide rails 10 in an essentially vertical direction. The elevator receives its lifting power from a hoisting machine 8 provided with a traction sheave 9, which is connected at least to an elevator control system 8*a*. The first end of the hoisting roping 1*b* is fixed to the fixing element 15 disposed in the upper part of the elevator shaft 6, from where the hoisting roping is led to pass first under the elevator car 7 around the diverting pulleys 17 to the traction sheave 9 of the hoisting machine 8 in the upper part of the elevator shaft, from where the hoisting roping 1*b* is further led to travel to the diverting pulley 13 of the counterweight 12, and after passing around the diverting pulley 13 the roping is led to the fixing point 16 disposed in the upper part of the elevator shaft, to which the second end of the hoisting roping is fixed. Both the traction sheave 9 and the diverting pulley 13 of the counterweight 12 are provided with jump guards 14, which can also if necessary be disposed on other rope pulleys. The elevator shaft 6 in FIG. 5 is truncated in such a way that of the floor levels only the bottommost, the next to topmost and the topmost floor 18 are visible. The rope suspension can, of course, also be different to that described.

FIG. 6 presents an elevator according to FIG. 6, in which the old hoisting roping 1*b* is currently being replaced with new hoisting roping 1*a*. With the rope replacement method according to the invention the elevator car 7 is driven at first to a suitable location in the shaft with regard to the replacement, which in the elevator according to the example is in the upper part of the elevator shaft. The elevator car 7 is driven so that the roof of the car is essentially at the level of the topmost floor 18 and locked into position e.g. by means of the safety gear 7*a* of the elevator. In addition the car staying in position is ensured with a safety chain or with other suitable means. Correspondingly the counterweight 12 is in this case in the lower part of the elevator shaft, where it is supported e.g. on the floor of the shaft 6 by means of support elements 19. Before starting the replacement the hoisting ropes 1*aa* of the new hoisting roping 1*a* that is still on reels 21 are taken to the topmost floor 18. Depending on the suspension solution of the elevator the reels 21 can be placed also elsewhere than on the topmost floor 18, e.g. on the bottommost floor, in which case the counterweight 12 is supported e.g. at the top end of the shaft.

After this the traction appliance 20 that is described in more detail in connection with FIG. 4 is fixed either to the guide rail 10 of the elevator car 7, to the structures of the hoisting machine 8 or to another suitable point such that after the fixing the friction wheel 24 presses against the traction sheave 9. Next the hoisting ropes on the side of the counterweight 12 are supported temporarily by fastening them to a suitable support point 22 e.g. on the top part of the elevator car 7. After the supporting the ends of the ropes on the side of the counterweight 12 are detached from their fixing point 16 and the freed ends of the ropes are guided to pass between the friction wheel 24 of the traction appliance 20 and the lifting wheel 25, after which the lifting wheel 25 is firmly tightened against the friction wheel 24, so that the ropes are compressed sufficiently strongly between the lifting wheel and the friction wheel. After this the temporary support of the hoisting ropes is removed by detaching the ropes from the support point 22.

Next the ends of the hoisting ropes on the side of the elevator car are detached from their fixing points 15, the hoisting ropes 1*aa* of the new hoisting roping 1*a* are threaded through the rope bars in the fixing points 15 and the new ropes 1*aa* are joined to the detached ends of the old ropes 1*bb* in the manner presented in FIGS. 1-3. The ropes can be guided into the shaft also with other suitable methods. Additionally special guide pipes are placed if necessary between the reels 21 and the rope bars, so that the new ropes do not become entangled with each other, become damaged or damage the structures of the building, such as doors and door frames, etc, as they leave the reels. In addition the guide pipes prevent the ropes from rubbing against sharp edges and prevent the ropes from making places dirty. The guide pipes are not shown in the figures. Also, before pulling the new ropes into position the safety circuit of the door of the topmost floor is bypassed with the stop button, in which case the hoisting machine 8 of the elevator can be driven while the doors of the topmost floor are open. After this the hoisting machine 8 is started in service drive and the new hoisting roping 1*a* is driven into position with service drive by pulling the new roping into position by means of the old hoisting roping 1*b*, which old hoisting roping 1*b* is guided to pass between the friction wheel 24 of the traction appliance 20 and the lifting wheel 25. The old rope 1*b* is at the same time guided into the elevator shaft or if desired onto a rope reel.

The driving of the ropes is stopped when the rope is driven so far that the ends of the new hoisting ropes 1*aa* come out of through the throat between the friction wheel and the lifting wheel of the traction appliance 20 so far that the ends can be fastened to their fixing points 16. After this the final ends of the old hoisting ropes 1*bb* are fastened e.g. to the previous temporary support point 22 for the ropes and the new ropes are cut between the joint location 5*a* and the traction appliance 20 such that the joint location remains on the side of the old ropes 1*bb* and such that the new ropes 1*aa* extend to their fixing points 16. Next the ends of the old ropes 1*bb* are carefully guided down and the new ropes 1*aa* are fastened e.g. to the previous temporary support point 22 for the ropes, after which the tightening between the friction wheel 24 and the lifting wheel 25 of the traction appliance 20 is loosened and the ends of the new ropes 1*aa* are fastened to their fixing points 16.

When the first ends of the new ropes 1*aa* are fastened to their fixing points 16, the rope tightnesses are equalized by means of the hoisting machine such that no slack sections remain in the roping 1*a*. Next the second ends of the new ropes 1*aa* are fastened to their fixing points 15 and the ropes are cut above the fixing points. After this the elevator car 7 and the counterweight 12 are detached from their supports and driven the necessary equalization runs and if necessary the rope tightnesses are equalized.

FIG. 7 presents a traction sheave elevator suspended in a different way to that presented above, in which the hoisting roping replacement method according to the invention can also be used. The figure presents a simplified side view of a traction sheave elevator without counterweight provided with hoisting roping 1*b* comprising parallel hoisting ropes 1*bb*. The elevator car 7 is suspended on the hoisting roping 1*b* and it moves backwards and forwards in the elevator shaft 6 along guide rails in an essentially vertical direction. The elevator receives its lifting power from a hoisting machine 8 provided with a traction sheave 9, which is connected at least to an elevator control system 8*a*. The first end of the hoisting roping 1*b* is fixed to the first fixing point 31 of the rope compensation appliance situated on the top part of the elevator car 7, from where the hoisting roping is led to run first upwards to the diverting pulley 30 of the rope compensation appliance and after passing over the top of it to the first diverting pulleys 27 in the lower part of the shaft 6, and after passing around the bottom of which the hoisting roping 1*b* is led to the diverting pulley 28 situated below the elevator car 7. After passing around the top of the diverting pulley 28 the hoisting roping 1*b* is further led to the second diverting pulleys 29 in the lower part of the elevator shaft 6, and after passing around the bottom of which the hoisting roping 1*b* is led to the traction sheave 9 of the hoisting machine 8 in the machine room 26 situated above the elevator shaft 6 via the diverting pulley 9*a*. From the traction sheave 9 the roping is led onwards to the diverting pulley 9*a* and after passing around the bottom of this the roping is once again led to the traction sheave 9. After passing around the top of the traction sheave a second time the roping is led downwards to the diverting pulley 32 on the roof of the elevator car, after passing around the bottom of which the hoisting roping is led to run upwards to the diverting pulleys 33 in the machine room 26, after passing around the top of which the roping is led to the fixing point 34 in the rope compensation appliance of the elevator car, to which the second end of the hoisting roping is fixed. In elevators without counterweight also the rope suspension can of course be different to what is described above. The elevator shaft 6 in FIGS. 7-9 is truncated in such a way that of the floor levels only the bottommost floor 18*a* and the next to bottommost floor are visible.

FIGS. 8 and 9 present an elevator according to FIG. 7, in which the old hoisting roping 1*b* is currently being replaced with new hoisting roping 1*a*. With the rope replacement method according to the invention the elevator car 7 is driven at first to a suitable location in the shaft with regard to the replacement, which in the elevator according to the example is in the lower part of the elevator shaft. The elevator car 7 is driven so that the roof of the car is essentially at a level midway between the next to bottommost and the bottommost floor 18*a* and locked into position e.g. by means of the safety gear of the elevator. In addition the car staying in position is ensured with a safety chains 35 or with other suitable means, which safety chains 35 are fixed to a sufficiently strong structure in the elevator shaft. Before starting the replacement the hoisting ropes 1*aa* of the new hoisting roping 1*a* that is still on reels 21 are situated on the bottommost floor 18*a*.

After this the first ends of the hoisting ropes are detached from their fixing points 31 and the new ropes 1*aa* of the new roping 1*a* are joined one at a time to the detached ends of the old ropes 1*bb* as described in FIGS. 1-3. Before pulling the new ropes 1*a* into position voice contact is made between the person supervising in the machine room and the person supervising the rope reels. Voice contact is maintained essentially throughout the period of the replacement. Next the safety circuit of the door of the bottommost floor is bypassed by means of the stop button, in which case the hoisting machine 8 can be driven while the door of the bottommost floor is open and in which case movement of the elevator car can if necessary be stopped also from below. After this the second ends of the old hoisting ropes 1*bb* are detached from their fixing points 34 and the hoisting machine 8 is started in service drive and the new hoisting roping 1*a* is driven into position with service drive by pulling the new roping 1*a* into position by means of the old hoisting roping 1*b*, which old hoisting roping 1*b* is at the same time guided onto the rope reel 36 on the bottommost floor 18*a* or if desired into the elevator shaft.

The driving of the ropes is stopped when the rope is driven so far that the starting ends of the new hoisting ropes 1*aa* come past all the rope pulleys so far that the starting ends can be fastened to their fixing points 34. After this the new ropes 1*aa* are cut so that the joint location 5*a* remains on the side of the old ropes 1*bb* and so that the new ropes 1*aa* extend to their fixing points 34. Next the ends of the old ropes 1*bb* are carefully guided onto the rope reels 36 and the ends of the new ropes 1*aa* are fastened to their fixing points 34.

When the starting ends of the new ropes 1*aa* are fastened to their fixing points 34, the final ends of the new ropes are cut at a suitable point and the final ends of the new ropes 1*aa* are fastened to their fixing points 31. After this the elevator car 7 is detached from being supported by the safety gear and is driven the necessary equalization runs by means of the hoisting machine 8 to equalize the rope forces and the rope tightnesses are equalized if necessary by means of the hoisting machine such that no slack sections remain in the roping 1*a*.

FIG. 10 presents a simplified side view of another traction sheave elevator provided with hoisting roping 1*b* comprising parallel hoisting ropes 1*bb* and with a counterweight 12, in which the hoisting roping replacement method according to the invention can be used. The elevator car 7 is suspended on the hoisting roping 1*b* with a suspension ratio 1:1 and it moves backwards and forwards in the elevator shaft 6 along guide rails 10 in an essentially vertical direction. The elevator receives its lifting power from a hoisting machine 8 provided with a traction sheave 9, which is connected at least to an elevator control system 8*a*. The first end of the hoisting roping 1*b* is fixed to the fixing element 38 on the top part of the elevator car 7, from where the hoisting roping is led to run to the traction sheave 9 of the hoisting machine 8 in the upper part of the elevator shaft or in the machine room, and after passing around the traction sheave 9 the hoisting roping 1*b* is further led to the fixing point 39 situated on the counterweight 12 that moves along guide rails 11 in an essentially vertical direction, to which the second end of the hoisting roping is fastened. The elevator shaft 6 in FIG. 10 is truncated in such a way that of the floor levels only the bottommost, the next to topmost and the topmost floor 18 are visible.

In the solution according to FIG. 10 a simpler traction appliance 20*a* is used than the traction appliance 20 described earlier. This solution contains only one friction wheel 37, essentially similar in construction to the friction wheel 24, which is fitted to press against the outer surface of the traction sheave 9 such that the hoisting ropes 1*bb* of the old hoisting roping 1*b* and the hoisting ropes 1*aa* of the new hoisting roping 1*a* press without slipping against the traction sheave 9 in connection with replacement of the roping.

In the elevator arrangement according to FIG. 10 replacement of the hoisting roping is performed e.g. in the way that the elevator car 7 is driven at first to a suitable location in the shaft with regard to the replacement, which in the elevator according to the example is in the upper part of the elevator shaft 6. The elevator car 7 is locked into position e.g. by means of the safety gear 7*a* of the elevator. In addition the car staying in position is ensured with a safety chain or with other suitable means. Correspondingly the counterweight 12 is in this case in the lower part of the elevator shaft, where it is supported e.g. on the floor of the shaft 6 by means of support elements 19. Additionally the friction wheel 37 is pressed strongly against the traction sheave 9 such that the hoisting ropes remain compressed between the friction wheel 37 and the traction sheave 9. The compression force of the friction wheel 37 is dimensioned so that the hoisting ropes do not slip on the traction sheave although the ends of the hoisting ropes are detached from their fixing points 38 and 39. Before starting the replacement the hoisting ropes 1*aa* of the new hoisting roping 1*a* that is still on reels 21 are taken to the topmost floor 18. The reels 21 and the actual performance of the replacement are not shown in FIG. 10. Instead the reels 21 are presented in a corresponding position in FIG. 6.

When it is verified in the manner described above that the hoisting ropes 1*bb* of the old hoisting roping 1*b* do not slip, the second ends of the old hoisting ropes are detached from their fixing points 39 and the first ends of the old hoisting ropes from their fixing points 38 and a sleeved extension is made on the first end of the old hoisting ropes according to what was explained earlier. After making the extension the hoisting ropes are driven, either all at the same time or one at a time, with the hoisting machine 8 of the elevator such that the hoisting ropes 1*bb* of the old hoisting roping 1*b* pull the new hoisting ropes 1*aa* of the new hoisting roping 1*a* into position in the place of the old at the same time as the old hoisting ropes are guided either onto reels or into a suitable collection place. When the new hoisting ropes are pulled into their position the extension is detached, the new hoisting ropes are cut to their right lengths and the ends of the new hoisting ropes are fastened to their fixing points 38 and 39.

The contact area between the friction wheel 24, 37 and the traction sheave 9 is preferably located aside from the zenith of the traction sheave 9. This way the need for deviating horizontally the roping 1*b* to be fed between the friction wheel 24 and the lifting wheel 25 is diminished. This way also the traction between the roping 1*a*, 1*b* and the traction sheave 9 can be increased on a chosen side of the contact area between traction sheave 9 and the friction wheel 24.

It is obvious to the person skilled in the art that the invention is not limited to the embodiments described above, in which the invention is described using examples, but that many adaptations and different embodiments of the invention are possible within the scope of the inventive concept defined by the claims presented below. Thus for example the elevator car can be locked into its position during replacement of the hoisting ropes in some other way than by lowering it to rest on the safety gear. The locking can in this case also be, for instance, by means of a guide rail brake or an arresting stop.

It is further obvious to the person skilled in the art that the elevator car suspension presented can be different to what is described above. The positioning and number of the diverting pulleys can vary and the compensation appliance can also be in the upper part of the elevator shaft, in which case certain details of the rope replacement are different than those explained in the examples above.

It is also obvious to the person skilled in the art that the sequence of the different phases of the method can differ to that presented. Thus for example detachment of the second ends of the hoisting ropes of the old hoisting roping can also be performed before connecting the ends of the old and the new hoisting ropes.

It is also obvious to the person skilled in the art that the core of the ropes used can be any suitable material whatever, such as steel, textile, Kevlar, Teflon, etc.

It is further obvious to the person skilled in the art that the construction of the equipment used in the replacement of the ropes of an elevator with counterweight can differ to what is presented above. Thus the friction surface of the friction wheel can be any material whatsoever that is suitable and essentially soft and that possesses essentially great friction, such as e.g. rubber, plastic or urethane and correspondingly there can be serration or some other suitable friction surface on the rim of the lifting wheel instead of V-grooves.

The invention claimed is:

1. A method for replacing old roping of an elevator to be replaced with new roping, which elevator comprises at least guide rails along which an elevator car provided with safety gear is arranged to travel in the elevator shaft in an essentially vertical direction, a hoisting machine, a traction sheave and roping, comprising:

forming a joint by joining ropes of the new roping and ropes of the old roping to each other at one of their ends, subsequently pulling the new roping into position by means of the old roping and a friction wheel, which friction wheel is arranged to press against the traction sheave and rotated by the traction sheave, and guiding the old roping to pass between the friction wheel and a lifting wheel arranged and adapted to be fitted against the friction wheel.

2. The method according to claim 1, further comprising:

forming a joint by joining the ropes of the new roping and the ropes of the old roping to each other by splicing the ropes together at one of their ends and by strengthening the joint by means of compressive sleeves.

3. The method according to claim 1, wherein at least the following procedures are performed in connection with replacement of the hoisting roping:

locking the elevator car into position in the elevator shaft;

detaching the ends that extend the hoisting ropes of the old hoisting roping from their first fixing points;

forming a joint by joining the hoisting ropes of the new hoisting roping and the hoisting ropes of the old hoisting roping together at one of their ends and securing the joint by means of compressive sleeves on top of the ropes;

detaching the hoisting ropes of the old hoisting roping from their second fixing point; and pulling the hoisting ropes of the old hoisting roping out of their position by means of the hoisting machine of the elevator using service drive while at the same time feeding the hoisting ropes of the new hoisting roping into the place of the old hoisting ropes.

4. The method according to claim 1 in an elevator equipped with a counterweight, wherein in connection with replacement of the hoisting roping at least the following procedures are performed:

locking the elevator car and the counterweight into position in the elevator shaft;

fastening the traction appliance for the ropes in such a way that the friction wheel in the traction appliance rests against the traction sheave of the hoisting machine;

detaching the ends of the hoisting ropes of the old hoisting roping on the counterweight side from their fixing points;

fitting and tightening the ends of the hoisting ropes of the old hoisting roping on the counterweight-side between the friction wheel and a lifting wheel in the traction appliance;

detaching the ends of the old hoisting ropes on the elevator car side from their fixing points;

forming a joint by joining the hoisting ropes of the new hoisting roping and the hoisting ropes of the old hoisting roping together at one of their ends and the joint is secured by means of compressive sleeves on top of the ropes; and pulling the hoisting ropes of the old hoisting roping out of their position by means of the hoisting machine of the elevator and the traction appliance using service drive while at the same time feeding the hoisting ropes of the new hoisting roping into the place of the old hoisting ropes.

5. The method according to claim 1, further comprising providing operational power to the traction sheave from the elevator hoisting machine for replacing the old roping with the new roping.

6. A method for replacing old roping of an elevator to be replaced with new roping, which elevator comprises at least guide rails along which an elevator car provided with safety gear is arranged to travel in the elevator shaft in an essentially vertical direction, a hoisting machine, a traction sheave and roping, comprising:

forming a joint by joining ropes of the new roping and ropes of the old roping to each other at one of their ends, subsequently pulling the new roping into position by means of the old roping and a friction wheel, which friction wheel is arranged to press against the traction sheave and rotated by the traction sheave, and forming a joint by joining the ropes of the new roping and the ropes of the old roping to each other by splicing the ropes together at one of their ends and by strengthening the joint by means of compressive sleeves.

7. The method according to claim 6, wherein the ropes of the old roping to be replaced are hoisting ropes having a core, and in that one of the ends of each of the new and old hoisting ropes is provided with one or more compressive sleeves, the ends are opened up for a suitable length, every second strand from the opened ends is removed and the core of one of the hoisting ropes is cut off, and the ends of the opened hoisting ropes are spliced together with the remaining non-removed strands around the core of the other hoisting rope, and in that the joint is reinforced at least at the point of the ends of the cut strands with compressive sleeves.

8. The method according to claim 7, further comprising:

reinforcing the joint location with one or more compressive sleeves between the ends of the cut strands.

9. The method according to claim 7, wherein at least the following procedures are performed in connection with replacement of the hoisting roping:

locking the elevator car into position in the elevator shaft;

detaching the ends that extend the hoisting ropes of the old hoisting roping from their first fixing points;

forming a joint by joining the hoisting ropes of the new hoisting roping and the hoisting ropes of the old hoisting roping together at one of their ends and securing the joint location by means of compressive sleeves on top of the ropes;

detaching the hoisting ropes of the old hoisting roping from their second fixing point; and pulling the hoisting ropes of the old hoisting roping out of their position by means of the hoisting machine of the elevator using service drive while at the same time feeding the hoisting ropes of the new hoisting roping into the place of the old hoisting ropes.

10. The method according to claim 6, wherein the joint is additionally reinforced with one or more compressive sleeves between the ends of the cut strands.

11. The method according to claim 10, wherein at least the following procedures are performed in connection with replacement of the hoisting roping:

locking the elevator car is locked into position in the elevator shaft;

detaching the ends that extend the hoisting ropes of the old hoisting roping from their first fixing points;

forming a joint by joining the hoisting ropes of the new hoisting roping and the hoisting ropes of the old hoisting roping together at one of their ends and securing the joint by means of compressive sleeves on top of the ropes;

detaching the hoisting ropes of the old hoisting roping from their second fixing point; and pulling the hoisting ropes of the old hoisting roping out of their position by means of the hoisting machine of the elevator using service drive while at the same time feeding the hoisting ropes of the new hoisting roping into the place of the old hoisting ropes.

12. The method according to claim 6, wherein at least the following procedures are performed in connection with replacement of the hoisting roping:

locking the elevator car is locked into position in the elevator shaft;

detaching the ends that extend the hoisting ropes of the old hoisting roping from their first fixing points;

forming a joint by joining the hoisting ropes of the new hoisting roping and the hoisting ropes of the old hoisting roping together at one of their ends and securing the joint by means of compressive sleeves on top of the ropes;

detaching the hoisting ropes of the old hoisting roping from their second fixing point; and pulling the hoisting ropes of the old hoisting roping out of their position by means of the hoisting machine of the elevator using service drive while at the same time feeding the hoisting ropes of the new hoisting roping into the place of the old hoisting ropes.

13. A method for replacing old roping of an elevator to be replaced with new roping, which elevator comprises at least guide rails along which an elevator car provided with safety gear is arranged to travel in the elevator shaft in an essentially vertical direction, a hoisting machine, a traction sheave and roping, comprising:

forming a joint by joining ropes of the new roping and ropes of the old roping to each other at one of their ends, subsequently pulling the new roping into position by means of the old roping and a friction wheel, which friction wheel is arranged to press against the traction sheave and rotated by the traction sheave, and locking the elevator car into position in the elevator shaft;

detaching the ends that extend the hoisting ropes of the old hoisting roping from their first fixing points;

forming a joint by joining the hoisting ropes of the new hoisting roping and the hoisting ropes of the old hoisting roping together at one of their ends and securing the joint by means of compressive sleeves on top of the ropes;

detaching the hoisting ropes of the old hoisting roping from their second fixing point; and pulling the hoisting ropes of the old hoisting roping out of their position by means of the hoisting machine of the elevator using a service drive while at the same time feeding the hoisting ropes of the new hoisting roping into the place of the old hoisting ropes.

14. A method for replacing old roping of an elevator equipped with a counterweight to be replaced with new roping, which elevator comprises at least guide rails along which an elevator car provided with safety gear is arranged to travel in the elevator shaft in an essentially vertical direction, a hoisting machine, a traction sheave and roping, comprising:

forming a joint by joining ropes of the new roping and ropes of the old roping to each other at one of their ends, subsequently pulling the new roping into position by means of the old roping and a friction wheel, which friction wheel is arranged to press against the traction sheave and rotated by the traction sheave, and locking the elevator car and the counterweight into position in the elevator shaft;

fastening the traction appliance in such a way that the friction wheel in the traction appliance rests against the traction sheave of the hoisting machine;

detaching the ends of the hoisting ropes of the old hoisting roping on the counterweight side from their fixing points;

fitting and tightening the ends of the hoisting ropes of the old hoisting roping on the counterweight side between the friction wheel and a lifting wheel in the traction appliance;

detaching the ends of the old hoisting ropes on the elevator car side from their fixing points;

forming a joint by joining together the hoisting ropes of the new hoisting roping and the hoisting ropes of the old hoisting roping at one of their ends and securing the joint by means of compressive sleeves on top of the ropes; and pulling the hoisting ropes of the old hoisting roping out of their position by means of the hoisting machine of the elevator and the traction appliance using service drive while at the same time feeding the hoisting ropes of the new hoisting roping into the place of the old hoisting ropes.

15. A method for replacing old roping of an elevator equipped with a counterweight to be replaced with new roping, which elevator comprises at least guide rails along which an elevator car provided with safety gear is arranged to travel in the elevator shaft in an essentially vertical direction, a hoisting machine, a traction sheave and roping, comprising:

forming a joint by joining ropes of the new roping and ropes of the old roping to each other at one of their ends, subsequently pulling the new roping into position by means of the old roping and a friction wheel, which friction wheel is arranged to press against the traction sheave and rotated by the traction sheave, and locking the elevator car and the counterweight into position in the elevator shaft;

fastening the traction appliance in such a way that the friction wheel in the traction appliance presses against the traction sheave of the hoisting machine;

detaching the ends of the hoisting ropes of the old hoisting roping on the counterweight side from their fixing points;

detaching the ends of the old hoisting ropes on the elevator car side from their fixing points;

joining the hoisting ropes of the new hoisting roping and the hoisting ropes of the old hoisting roping together at one of their ends and securing the joint location by means of compressive sleeves on top of the ropes; and pulling the hoisting ropes of the old hoisting roping out of their position by means of the hoisting machine of the elevator and the friction wheel of the traction appliance using a service drive while at the same time feeding the hoisting ropes of the new hoisting roping into the place of the old hoisting ropes.

16. A method for replacing old roping of an elevator equipped with a counterweight to be replaced with new roping, which elevator comprises at least guide rails along which an elevator car provided with safety gear is arranged to travel in the elevator shaft in an essentially vertical direction, a hoisting machine, a traction sheave and roping, comprising:

forming a joint by joining ropes of the new roping and ropes of the old roping to each other at one of their ends, subsequently pulling the new roping into position by means of the old roping and a friction wheel, which friction wheel is arranged to press against the traction sheave and rotated by the traction sheave, and locking the elevator car into position in the elevator shaft;

detaching the ends that extend the hoisting ropes of the old hoisting roping from their first fixing points;

forming a joint by joining the hoisting ropes of the new hoisting roping and the hoisting ropes of the old hoisting roping together at one of their ends and securing the joint by means of compressive sleeves on top of the ropes;

detaching the ends of the old hoisting ropes of the old hoisting roping from their fixing point; and pulling the hoisting ropes of the old hoisting roping out of their position by means of the hoisting machine of the elevator using service drive while at the same time feeding the hoisting ropes of the new hoisting roping into the place of the old hoisting ropes.

17. A traction appliance arrangement for replacing elevator ropes in an elevator provided with a hoisting machine and a traction sheave, wherein the arrangement comprises:

at least a traction appliance fixed into position in the elevator shaft, which appliance contains a frame, onto which frame a friction wheel provided with a friction surface is fitted with bearings allowing rotation, which friction wheel is arranged to press against the traction sheave; and a lifting wheel provided with a suitable friction surface is fitted with bearings allowing rotation to the frame, in addition to the friction wheel, and wherein the elevator hoisting rope to be replaced is arranged for placement between the friction surfaces of the friction wheel and the lifting wheel, and wherein at least one of the wheels is fitted to be tightened against the other wheel when the elevator rope is placed between the friction surfaces of the wheels.

18. The traction appliance arrangement according to claim 17, wherein the friction surface of the friction wheel is at least one of rubber, plastic, urethane or another flexible material.

19. The traction appliance arrangement according to claim 17, wherein a rim of the lifting wheel is provided with at least one of grooving, serration or another surface characteristic having large friction.

* * * * *